United States Patent [19]

Sansom et al.

[11] Patent Number: 4,956,636

[45] Date of Patent: Sep. 11, 1990

[54] E.A.S. TAG HAVING A CONTROL COMPONENT WITH SELECTIVELY MAGNETIZEABLE REGIONS

[75] Inventors: David J. Sansom, Chertsey; Simon N. M. Willcock, High Wycombe; Robert A. Woolley, Uxbridge, all of England

[73] Assignee: Thorn Emi plc, London, England

[21] Appl. No.: 390,993

[22] Filed: Aug. 9, 1989

[30] Foreign Application Priority Data

Aug. 9, 1988 [GB] United Kingdom ................. 8818849

[51] Int. Cl.$^5$ ............................................. G08B 13/24
[52] U.S. Cl. ..................................... 340/551; 340/572
[58] Field of Search ................................ 340/551, 572

[56] References Cited

U.S. PATENT DOCUMENTS 4,746,908 5/1988 Montean ............................. 340/572
4,799,045 1/1989 Fearon et al. ....................... 340/572

Primary Examiner—Glen R. Swann, III
Attorney, Agent, or Firm—Fleit, Jacobson, Cohn, Price, Holman & Stern

[57] ABSTRACT

A tag for use with an electromagnetic identification system includes a magnetic control component 1, having alternating regions 10, 20 of, respectively, high and medium coercivity material, and an element 30 of magnetically soft material. The element 30 may be polarized so as to deactivate the tag by, for example, selectively demagnetizing the regions 20 of medium coercivity, such as by exposing the tag to an alternating magnetic field having an initial field strength which is intermediate between the coercivity of the regions 10, 20, which may be formed as a striped coating or from a number of discrete magnetic components.

11 Claims, 3 Drawing Sheets

10': HIGH COERCIVITY MATERIAL ($H_c > 300$ oerst)

20': MEDIUM COERCIVITY MATERIAL ($H_c \gtrsim \frac{50 \text{ oerst}}{300 \text{ oerst}}$)

30': LOW COERCIVITY MATERIAL ($H_c < 2$ oerst) WITH HIGH PERMEABILITY OR SQUARE B-H LOOP ($B_r \approx 10,000$ gauss)

$10'$: HIGH COERCIVITY MATERIAL ($H_c > 300$ oerst)
$20'$: MEDIUM COERCIVITY MATERIAL ($H_c \gtrsim 50$ oerst $\gtrsim 300$ oerst)
$30'$: LOW COERCIVITY MATERIAL ($H_c < 2$ oerst) WITH HIGH PERMEABILITY OR SQUARE B-H LOOP ($B_s \approx 10{,}000$ gauss)

E.A.S. TAG HAVING A CONTROL COMPONENT WITH SELECTIVELY MAGNETIZEABLE REGIONS

BACKGROUND OF THE INVENTION

This invention relates to an electromagnetic identification system of a kind which can be employed, for example, in electronic article surveillance (E.A.S.), as it may be used for in-store security, in access control, or in other applications such as the protection of documents or data storage devices at a place of work.

In any environment, an element is used which influences an electromagnetic field, so causing a disturbance in a characteristic of the field as detected by a detector device. The element is frequently referred to as a "tag" and needs to exhibit a number of characteristics one of which, especially relevant for in-store usage, is the capability of being readily de-activated by check-out personnel whilst being difficult for a would-be thief to de-activate.

It is usual for the element, or tag, to contain a strip of highly permeable magnetic material. Such material is easily influenced by a relatively weak interrogating field, causing the generation of a number of harmonic frequencies which are readily detected by a suitable detection device. Unless it is proposed to physically fracture or mechanically strain the strip in order to de-activate it, and such activities would place severe limitations upon the form which a tag could take, de-activation is usually achieved by magnetising a control element consisting of a normally unmagnetised, magnetically hard material disposed in the tag and configured so as to produce a series of poles along the length of the strip of highly permeable material when so magnetised. This alters the magnetic "profile" of the tag, as presented to the interrogating field, and inhibits or characteristically alters the generation of the aforementioned harmonics, thus permitting the detection device to distinguish between activated and de-activated tags.

It has been usual hitherto for the magnetically hard material constituting the control element to be provided either in the form of discontinuous lengths running close to the strip of magnetically soft material, or in continuous lengths similarly disposed. In the first case, de-activation is relatively straightforward for check-out personnel to accomplish, but the same can be said for would-be thieves as a single swipe along the tab with a permanent magnet of appropriate strength is all that is required to magnetise the magnetically hard material. In the second case, more care has to be taken by the check-out personnel because the continuous length of magnetically hard material has to be selectively magnetised to produce a pole pattern sufficient to change the electromagnetic profile of the tag, but at the same time de-activation is made more difficult for the would-be thief. It is an object of the present invention to provide an improved tag.

SUMMARY OF THE INVENTION

In accordance with this invention, a tag for use in an electromagnetic identification system comprises an element of magnetically soft material and, in magnetic communication therewith for enabling polarisation of the element, a magnetic control component including first and further regions having, respectively, first and further magnetic characteristics for enabling magnetisation or demagnetisation of first or further regions independently of the other regions. The magnetic characteristic may comprise magnetic coercivity or Curie temperature. Preferably, the element of magnetically soft material is of striplike form.

The invention provides for an arrangement in which the control element is such as to leave the tag in an activated condition whether said control element is unmagnetised or uniformly magnetised but can, with an appropriately configured deactivating device, be selectively magnetised to de-activate the tag.

BRIEF DESCRIPTION OF THE DRAWINGS

In order that the invention may be clearly understood and readily carried into effect, some embodiments thereof will now be described by way of example only with reference to the accompanying drawings, of which.

DESCRIPTION OF THE PREFERRED EMBODIMENT

Figure 1A:
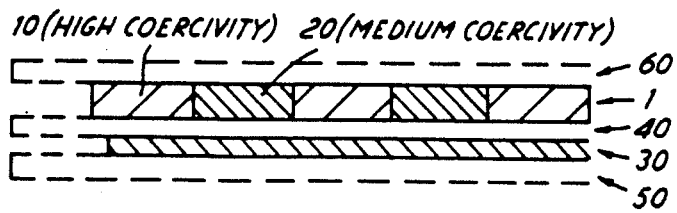
FIGS. 1(a) to 1(e) shows a schematic view of a tag and various active and deactivated states thereof.
Figure 2:
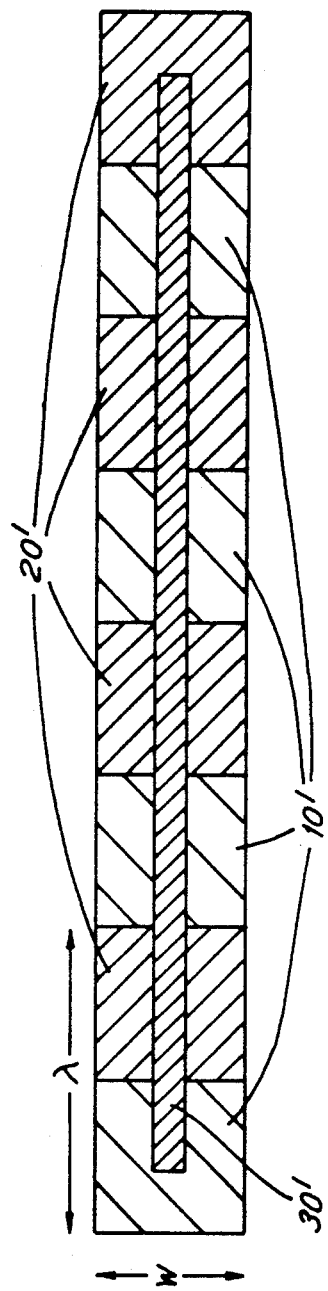
FIG. 2 shows another form of tag.

One way of implementing the invention is to provide a tag that is active when the control element (magnetically hard material) is magnetised and deactivated by a.c. demagnetisation, as this is very difficult to defeat. Such a tag can be constructed, in accordance with one example of the invention, as shown in FIG. 1a. Here the magnetically hard material of the control component 1 consists of alternating regions 10, 20 respectively, of high and medium coercivity magnetic material, the length of the repeat pattern of the regions 10 and 12 being the wavelength of the tag, as shown in FIG. 2. The magnetically soft material (i.e. with low coercivity) is provided in the form of a ribbon or film 30 spaced from the control element 1 by a magnetically inert spacing layer 40 (the thickness of which is small relative to the pitch of alternating hard regions and can be zero). An adhesive layer 50 may be provided to cause the tag as a whole to adhere to a chosen substrate and a bar code or other printed layer 60 may be provided on top of the control element if desired.

Figure 1B:
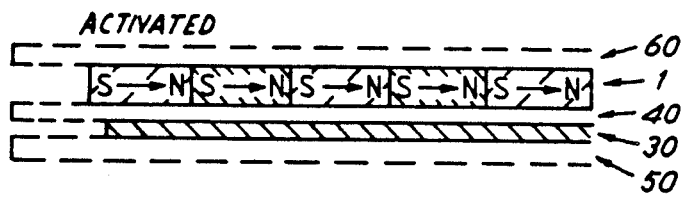
Figure 1C:
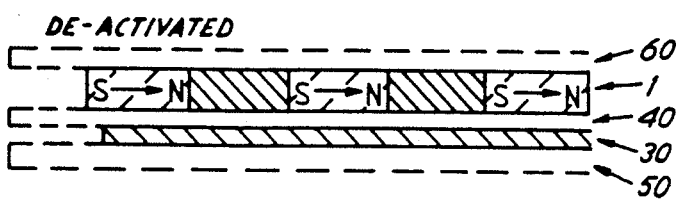

When the tag is uniformly magnetised, as shown in FIG. 1(b), the control element 1 will produce a small bias field which fluctuates only to a limited extent along the length of ribbon or film 30 and the tag will remain active. At a checkout, or other point of sale or validation, the tag is exposed to a decaying, alternating magnetic field, the initial (peak) strength of which is intermediate between the coercivities of the regions 10 and 20 of the control element 1, and this results in demagnetisation of the regions 20 of medium coercivity as illustrated in FIG. 1(c), creating the pole pattern in the control element 1 necessary to deactivate the tag.

If necessary, a small d.c. component of the appropriate polarity can be superimposed on the alternating field to prevent anhysteretic magnetisation of the regions 20 of lower coercivity. The same technique can also be used to achieve reverse magnetisation in the regions 20 of lower coercivity, as shown in FIG. 1(d).

Figure 1D:
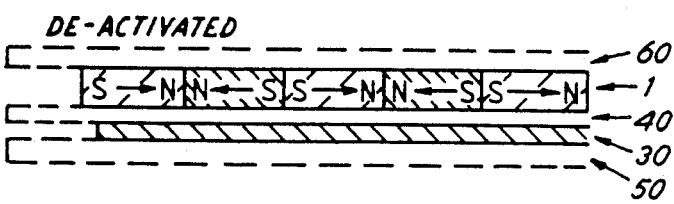
Figure 1E:
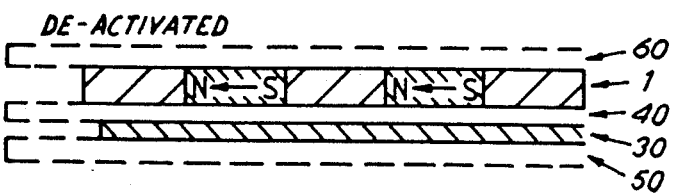

The tag can alternatively be deactivated using an alternating and decaying magnetic field of initial (peak) value higher than that of the regions 10 of higher coercivity, to demagnetise both sets of regions 10 and 20 in the control element 1, succeeded by a d.c. magnetic field of intermediate magnitude sufficient to remagnetise only the regions 20 of lower coercivity, as illustrated in FIG. 1(e).

It is further possible to deactivate the tag 1 without the use of alternating fields by applying a large pulse of d.c. magnetic field, to magnetise the regions of both high and low coercivity in the same direction, followed by a smaller d.c. magnetic field in the opposite direction to reverse the magnetisation of the regions 20 of lower coercivity, achieving the effect shown in FIG. 1(d).

It will thus be understood that the tag 1 can be proximity deactivated at the checkout, using coils to generate an alternating magnetic field. It is also possible to combine detection and deactivation circuitry to give positive confirmation of deactivation.

Thus far, the two sets of regions 10, 20 have been described as having different coercivities, but it will be appreciated that regions having differences in other magnetic parameters or characteristic could alternatively be used. For example, two hard magnetic materials of differing Curie temperatures could be used; deactivation of such tags requiring a momentary elevation of the temperature of the tag. This may be achieved by the use of a hand held laser scanner possibly in combination with a conventional barcode reader.

In one arrangement, as shown in FIG. 2, a ribbon 30' of magnetically soft material is disposed alongside a control element consisting of alternate regions 10', 20' of material of high and medium coercivities respectively.

Each of the regions 10' comprises six layers of three micron-thickness metal particle (mp) tape of width 8 mm, whilst each of the regions 20' comprises two layers of fifty micron-thickness of an iron oxide (Fe2O3) tape, also of width 8 mm. The element 30' may comprise typically either a ribbon of thickness twenty-six microns and width 1 mm or a permalloy film of thickness two microns and width 4 mm.

Dimensional and magnetic characteristics of the above-described elements may conform to the values shown in the following table:

| | Coercivity $H_c$ (Oerst.) | $B_r$ or $B_s$ Flux Density B (Gauss) | total coating thickness t (mm) | Width W (mm) | Flux $B_t$ W |
|---|---|---|---|---|---|
| 10' mp Tape | 1400 | 2400 | 0.018 | 8 | 350 |
| 20' Fe2O3 | 100 | 750 | 0.100 | 8 | 600 |
| 30' ribbon or | 0.1 | 9600 | 0.026 | 1 | 250 |
| permalloy film | 0.75 | 8800 | 0.002 | 4 | 70 |

When using a ribbon as the magnetically soft element 30', the available steady state flux and field levels are sufficient to de-activate the tag in accordance with the arrangement shown in FIG. 1 (d). This may be achieved by effecting a single swipe along the tag with a neodymium-iron-boron magnet block generating a field of about +5000 Oe, and with the block in wiping contact with the tag, to fully magnetise regions 10' and 20' in the same direction, followed by a reverse swipe with the block spaced from the tag by about 5 mm, reducing the peak field to about −500 Oe, to reverse magnetise the regions 20'.

If the metal particle and iron oxide tapes have insufficient tape coating thickness, it may not be possible to create the de-activated conditions shown in FIGS. 1(c) and 1(e) with the ribbon 30'. However, improved results may be obtained by the use of the thin permalloy film for the element 30', for all methods of deactivation, over a range of wavelengths up to $\lambda = 20$ mm.

To enable the arrangements shown in FIGS. 1c and 1e to be successfully implemented using a ribbon for the element 30', a better match between the available fluxes from regions 10' and 20' is required, and this flux should preferably be sufficient to ensure that enough flux enters the ribbon 30' to saturate it, after allowing for leakage. Leakage will be more for a small wavelength, but effective field will be reduced at large wavelength. The optimum for a narrow ribbon and wide tape is likely to be such that $\lambda \omega 2W$, where W is the tape width.

With a thin film low coercivity magnetic layer, instead of a narrow ribbon, the element 30' of FIG. 2 may be made the same, or nearly the same width (W) as the high and medium coercivity components 10' and 20'. The optimum wavelength is then reduced with less allowance for flux leakage required. It may not be necessary to fully saturate the ribbon or film 30' to ensure satisfactory de-activation, as long as the bias field values and magnetic field variations in the element 30' provided by layer 1 in FIGS. 1c, d or e are sufficiently high to spread out the switching of element 30' over a large time interval, instead of giving sharp pulses.

Approximate calculations for 2 cases are as follows:

EXAMPLE 1

8 mm wide tape with $\lambda = 16$ mm 1 mm × 0.026 mm RIBBON with $B_s = 9600$ gauss where $B_s$ is the saturation flux density Flux to Saturate = 250 gauss mm²

Flux Required = 1000 gauss mm²

(upper limit to saturate, with leakage allowance of 4×)

10' MP-tape with $B_r = 2400$ gauss requires t = 52 micron

20' Fe2O tape with $B_r = 1000$ gauss requires t = 125 micron where $B_r$ is the remanent flux density and t is the thickness of the magnetic tape coating.

The calculated average field produced by either region 10' or region 20' alone is then: 20 Oe for $\lambda = 16$ mm.

EXAMPLE 2

8 mm wide tape 8 mm × 0.002 PERMALLOY with $B_s = 8800$ gauss

Flux to Saturate = 140 gauss mm²

Flux Required = 280 gauss mm² (allowing for leakage)

(upper limit to saturate, with leakage allowance of 2×)

Regions 10': MP-tape with $B_r = 2400$ gauss requires t = 15 micron

Regions 20': —Fe2O3 with $B_r = 1000$ gauss requires t = 35 micron

The calculated average field $H_{av}$ produced by either 10' or 20' alone is:

λ = 20 16 12 8 4 mm
$H_{av}$=4.45.77.812.225.0 Oe

A wavelength of λ=5 mm would give $H_{av}$=20 Oe, in this case, but this is not necessarily the optimum wavelength to use. The optimum wavelength may be anywhere between 4 and 16 mm, depending on thicknesses, spacing, pulse shape requirements etc.

Experimental EAS tags have been made using one layer of soft and one layer of hard magnetic material. The soft layer comprised of NiFe, approximately 1 μm thick, with a coercivity of 0.7 Oe and a well defined easy axis of magnetisation. The NiFe film was deposited onto a flexible polyester substrate by electro-plating, thin films of Cr and Cu having first been deposited in vacuum as a "strike layer" for the NiFe. A rectangle 30 mm by 20 mm was then cut out and used as the switching element 30 in the experimental tag. A hard magnetic layer of the same area was made by cutting out strips of two different magnetic tapes and arranging the strip pieces as shown in FIG. 1. This high coercivity material used was from a 3 μm thick Metal Particle video tape coating, coercivity 1450 Oe; the lower coercivity material used was from a 40μm thick coating of isotropic 100 Oe iron oxide particles. In the case of the high coercivity material, the strips were cut at 90 degrees to the easy axis and a stack of three layers was used for each stripe (i.e. 9 μm magnetic coating thickness) to give the same remanent magnetisation in both materials, when magnetised across their width.

Figure 3A:
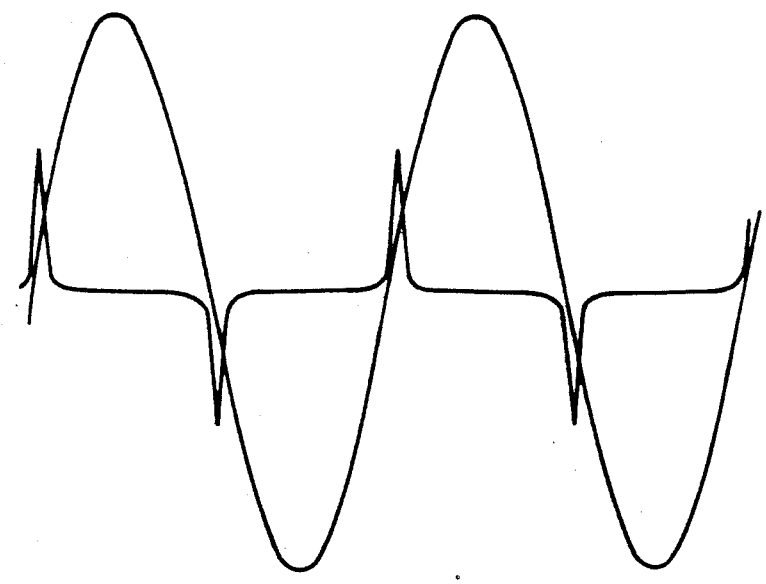
FIGS. 3(a) and 3(b) show signals as detected with a tag in active and deactivated conditions respectively.
Figure 3B:
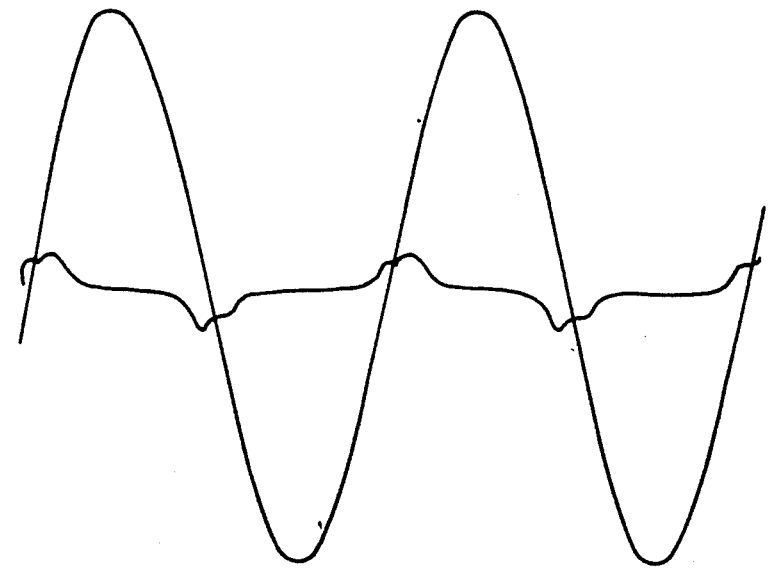

The tag was activated by a transverse swipe with a magnet and deactivated with a hand held a.c. tape demagnetiser; FIGS. 3(a) and 3(b) show respectively the detected signal pattern with the tag active and deactivated.

With regard to the manufacture of tags in accordance with this invention, the following process may be adopted:

1. The soft layer is deposited in a semi-continuous process by passing a roll of flexible substrate (e.g. polyester) through a series of plating baths to build up the necessary strike and soft layers.
2. The hard layer is deposited in a semi-continuous process using a modification of a conventional magnetic tape coating method, in which a flexible substrate (e.g. polyester) is passed under a coating trough fitted internally with a number of separating panels. The channels in between the separators are fed alternately with dispersions of the two magnetic particles to generate a striped coating of uniform thickness and required magnetic characteristics. The wet coating is then passed, before drying, over an orientating magnetic field arranged at approximately 90 degrees to the direction of pass.

Cobalt doped iron oxide and gamma iron oxide may be used, respectively, for the magnetic particles used to form the high and medium coercivity regions 20, 30 of the control element 1.

Although the present invention has been described with respect to specific embodiments it should be understood that modifications may be effected whilst remaining within the scope of the invention. For example, the magnetically soft element need not necessarily be of strip form. The element may be fabricated in any shape, the requirement being that the length and width are much larger than its thickness. Hence the tag shape can be made compatible with a price or bar code label and the tag may, therefore, be provided with a boundary layer for displaying the bar code, price or other label information.

Additionally, the magnetically soft element may be coated directly onto a copper foil, thereby obviating the need for an intermediate strike layer.

Furthermore, the tag as described has the magnetically hard and soft layers formed integrally with a substrate. The tags may also be of a form that can be transferred from the substrate onto an item to be tagged.

Also, it will be appreciated that other magnetic materials may be used to form the medium and high coercivity regions of the control element.

We claim:

1. A tag for use with an electromagnetic identification system, the tag comprising an element of magnetically soft material and, in magnetic communication therewith for enabling polarisation of the element, a magnetic control component including first and further regions having, respectively, first and further magnetic characteristics for enabling magnetisation or demagnetisation of first or further regions independently of the other regions.

2. A tag according to claim 1 wherein the first and further magnetic characteristics comprise magnetic coercivity.

3. A tag according to claim 2 wherein the first regions of the magnetic control component comprise cobalt-doped iron oxide, thereby to provide regions of relatively high coercivity, and the further regions of the magnetic control component comprise gamma iron oxide, thereby to provide regions of medium coercivity.

4. A tag according to claim 1 wherein the first and further magnetic characteristics comprise Curie temperature.

5. A tag according to claim 1 wherein the element of magnetically soft material is of strip form.

6. A tag according to claim 1 wherein the element of magnetically soft material comprises a permalloy film.

7. A tag according to claim 6 wherein the permalloy film is supported by a copper foil.

8. A tag according to claim 1 wherein the magnetic control component comprises a coating of magnetic material having, respectively, the first and further magnetic characteristics in the first and further regions thereof.

9. A tag according to claim 1 wherein the first and further regions of the magnetic control component comprise first and further discrete components of magnetic material having, respectively, the first and further magnetic characteristics.

10. A tag according to claim 1 comprising a boundary layer for displaying information.

11. A tag according to claim 1 comprising a substrate for supporting the tag and/or for enabling the tag to be attached to an item to be surveilled.

* * * * *